(12) United States Patent
Okabe et al.

(10) Patent No.: US 7,338,099 B2
(45) Date of Patent: Mar. 4, 2008

(54) BUMPER BEAM STRUCTURE HAVING SUPPORT WALLS FOR CENTER GUSSET, WHICH ARE LAID OVER WALLS OF BUMPER BEAM

(75) Inventors: Kojiro Okabe, Utsunomiya (JP); Katsuhiko Shiotsuki, Kawachi-gun (JP); Nobuyuki Tsuichihara, Utsunomiya (JP); Noboru Hayashi, Kawachi-gun (JP)

(73) Assignee: Honda Motor Co., Ltd., Tokyo (JP)

( * ) Notice: Subject to any disclaimer, the term of this patent is extended or adjusted under 35 U.S.C. 154(b) by 50 days.

(21) Appl. No.: 11/269,386

(22) Filed: Nov. 8, 2005

(65) Prior Publication Data

US 2006/0138790 A1    Jun. 29, 2006

(30) Foreign Application Priority Data

Dec. 24, 2004    (JP)    .............................. 2004-372917

(51) Int. Cl.
*B60R 19/02*    (2006.01)
(52) U.S. Cl. .................................... 293/102
(58) Field of Classification Search ................ 293/102, 293/120, 121, 132, 142, 155
See application file for complete search history.

(56) References Cited

U.S. PATENT DOCUMENTS

| | | | |
|---|---|---|---|
| 3,310,330 A | * | 3/1967 | Kessler ....................... 293/142 |
| 3,897,095 A | | 7/1975 | Glance et al. |
| 4,018,466 A | | 4/1977 | Norlin |
| 4,482,180 A | | 11/1984 | Huber et al. |
| 5,545,022 A | * | 8/1996 | Rosasco ...................... 425/110 |
| 5,545,361 A | * | 8/1996 | Rosasco ...................... 264/45.2 |
| 5,560,662 A | * | 10/1996 | Apgar et al. ................. 293/121 |
| 6,364,384 B1 | | 4/2002 | Kemp et al. |
| 6,962,379 B2 | * | 11/2005 | Minami et al. .............. 293/120 |

FOREIGN PATENT DOCUMENTS

| | | |
|---|---|---|
| JP | 06-286536 | 10/1994 |
| JP | 2001-322517 | 11/2001 |
| WO | 01/92064 | 12/2001 |

* cited by examiner

*Primary Examiner*—H Gutman
(74) *Attorney, Agent, or Firm*—Rankin, Hill, Porter & Clark LLP

(57) ABSTRACT

A bumper beam structure has a metal and molded bumper beam main body extending in a width direction of a vehicle, wherein a rear face of the main body is joined to side frames of the vehicle; and a center gusset joined to a center portion of the bumper beam main body in the length direction of the main body so as to produce a closed section at a front face of the bumper beam main body. The center gusset has a pair of support walls which are respectively adhered and fastened to upper and lower walls of the bumper beam main body in a manner such that the support walls are respectively laid over the upper and the lower walls. Preferably, in each support wall, ends in a length direction of the support wall are inclined with respect to a plane which is perpendicular to the length direction.

15 Claims, 4 Drawing Sheets

BUMPER BEAM STRUCTURE HAVING SUPPORT WALLS FOR CENTER GUSSET, WHICH ARE LAID OVER WALLS OF BUMPER BEAM

BACKGROUND OF THE INVENTION

1. Field of the Invention

The present invention relates to a bumper beam structure which functions as a frame portion of a bumper of a vehicle.

Priority is claimed on Japanese Patent Application No. 2004-372917, filed Dec. 24, 2004, the content of which is incorporated herein by reference.

2. Description of the Related Art

In a bumper of a vehicle (i.e., a vehicle bumper), a bumper beam extending in a width direction of the vehicle is attached to ends of a pair of side frames, and a bumper face made of resin is attached to the front side of the bumper beam.

Recently, a structure in consideration of a low-speed crash against a support pole or the like (called a "pole crash", hereinbelow) is sometimes employed for the vehicle bumper. Such a vehicle bumper has a specific bumper beam structure for flexibly absorbing a load in a crash (see, for example, Japanese Unexamined Patent Application, First Publication No. H6-286536).

In the disclosed bumper beam structure, a bumper beam main body is integrally formed by extrusion molding using an aluminium material, and a center gusset formed as a separated body is joined to substantially the center of the bumper beam main body in the length direction thereof. The center gusset is attached and fastened to the front face of the bumper beam main body (i.e., the face to which the bumper face is attached), thereby producing a closed-section form at the front side of the bumper beam main body.

In the above bumper beam structure, when a pole crash occurs, the center gusset positioned at substantially the center of the bumper beam main body receives a load from a support pole or the like and is easily crushed. A further load input makes the bumper beam main body bend, and finally a section of the deformed bumper beam main body is crushed.

In the above conventional bumper beam structure, in order to reliably make the center gusset crush first when a pole crash occurs, it is necessary to improve the geometrical moment of inertia of a support portion (in the bumper beam main body) for the center gusset. However, in the conventional bumper beam structure, the bumper beam main body is a metal body formed by extrusion molding. Therefore, when the geometrical moment of inertia of the support for the center gusset is improved by increasing the thickness thereof, the thickness of the whole bumper beam main body should be increased, so that the weight of the vehicle is increased.

In addition, such an increase in the thickness of the whole bumper beam main body causes an increase in a load for crushing a section of a side edge of the bumper beam main body. Therefore, it is difficult to perform tuning for delaying buckling of a vehicle's side frame in comparison with the crushing of a section of the bumper beam main body when a high-speed offset crash occurs.

SUMMARY OF THE INVENTION

In light of the above circumstances, an object of the present invention is to provide a bumper beam structure which is reliably effective in various types of crashes, and by which when a pole crash occurs, the center gusset can reliably be crushed first without causing problems such as an increase in the weight of the vehicle.

Therefore, the present invention provides a bumper beam structure comprising:

a bumper beam main body (e.g., a bumper beam main body 3 in an embodiment explained later) which is a metal and molded material and extends in a width direction of a vehicle, wherein a rear face side of the bumper beam main body is joined to side frames (e.g., rear side frames 2 in the embodiment) on either side of the vehicle; and a center gusset (e.g., a center gusset 4 in the embodiment) joined to a substantially center portion of the bumper beam main body in the length direction of the bumper beam main body so as to produce a closed section at a front face of the bumper beam main body, wherein:

the center gusset has a pair of support walls (e.g., support walls 19 and 20 in the embodiment) which are respectively adhered and fastened to upper and lower walls (e.g., an upper wall 10 and a lower wall 11 in the embodiment) of the bumper beam main body in a manner such that the support walls are respectively laid over the upper and the lower walls.

According to the above structure, portions of the upper and the lower walls, which are positioned at a substantially center portion of the bumper beam main body in the length direction of the bumper beam main body, are reinforced by the support walls. Therefore, the thickness of each relevant portion of the upper and the lower walls substantially increases, thereby increasing the geometrical moment of inertia of this portion. As a result, when a pole crash occurs, the center gusset can be reliably crushed first, thereby improving performance for impact absorption. Additionally, it is possible to prevent increase in the thickness of portions of the bumper beam main body other than the portion for supporting the center gusset. That is, the thickness of the whole bumper beam main body is not increased, so that the weight of the vehicle is not increased and no unnecessary increase in a load for crushing a section of a side edge of the bumper beam main body is caused.

Therefore, the present invention is reliably effective in various types of crashes, such as a pole crash, a flat crash, or an offset crash, without causing problems such as an increase in the weight of the vehicle.

In addition, the support walls of the center gusset are fastened to the upper and the lower walls of the bumper beam main body by adhesion. Therefore, a wide area joint is provided between the support walls and the bumper beam main body, thereby improving the strength of the joint.

In each support wall, ends (e.g., ends 26a and 26b in the embodiment) in a length direction of the support wall may be inclined with respect to a plane (e.g., a plane D in the embodiment) which is perpendicular to the length direction. Accordingly, when an impact load is applied to a side edge of the bumper beam main body due to a high-speed offset crash or the like, stress applied to the boundary between each end and the bumper beam main body can be widely distributed over a wider area along the inclined line of the end. Therefore, less stress concentration occurs in the bumper beam main body, thereby reliably increasing the performance for impact absorption of the bumper beam main body when a high-speed offset crash or the like occurs.

Preferably, the center gusset has a fitting portion (e.g., a fitting portion 21 in the embodiment) which contacts a front face of a front wall of the bumper beam main body. In this case, when a load in a crash is imposed on the center gusset due to a pole crash or a flat crash, the load is supported via the fitting portion by the front side (i.e., the front face) of the bumper beam main body. Therefore, a shearing load is not easily applied to the support wall adhered to the upper or the lower wall of the bumper beam main body. That is, a load in a crash input into the center gusset can be reliably supported via the fitting portion by the front face of the front wall of the bumper beam main body, thereby reducing a shearing load applied to the adhered support wall of the center gusset and reliably preventing the support wall from being detached from the upper or the lower wall.

In this case, preferably, the center gusset has a coupling wall (e.g., a coupling wall 117 in the embodiment) which is joined to either of the support walls and is bent so that a step form is produced by the coupling wall and said either of the support walls, and the fitting portion belongs to the coupling wall. Accordingly, a load in a crash input into the center gusset is supported via the coupling wall and the fitting portion by the front face of the bumper beam main body. In addition, the coupling wall is bent so that a step form is produced by the coupling wall and the relevant support wall; thus, input of a shearing load into the support wall adhered to the upper or the lower wall is more difficult. Also in this structure, the coupling wall, which belongs to a path for transmitting the load of the crash from the center gusset to the bumper beam main body, has an offset position with respect to the support wall, thereby further reliably preventing the support wall from being detached.

It is possible that:

the bumper beam main body has a front wall and a rear wall (e.g., a front wall 7 and a rear wall 8 in the embodiment), and an intermediate wall (e.g., an intermediate wall 9 in the embodiment) for connecting the front and the rear walls which is integrally formed with the front and the rear walls; and the center gusset has a rib (e.g., a rib 25 in the embodiment) provided on a back face of the center gusset in a manner such that the rib faces a front face of the front wall of the bumper beam main body and that the rib and the intermediate wall form a straight line.

In this case, according to the rib, the geometrical moment of inertia of the center gusset and the substantially center portion of the bumper beam main body is improved, and the load for the crushing in the front-rear direction of the center gusset is also improved. Additionally, the rib is formed in a manner such that the rib and the intermediate wall form a straight line; thus, when a load in a crash is input into the center gusset, the back of the rib is supported by the intermediate wall. Therefore, the geometrical moment of inertia of the center gusset and the substantially center portion of the bumper beam main body and the load for the crushing in the front-rear direction of the center gusset can be improved so as to obtain well-balanced values of the geometrical moment of inertia and the load for the crushing. Accordingly, it is possible to easily and reliably obtain performance for impact absorption preferable for a pole crash.

The bumper beam main body may have:

a front wall and a rear wall, and an intermediate wall for connecting the front and the rear walls which is integrally formed with the front and the rear walls; and a rib (e.g., a second rib 14 in the embodiment) provided on a front face of the front wall in a manner such that the rib and the intermediate wall form a straight line and that the rib faces a back face of the center gusset.

According to the above rib provided on the front face of the front wall of the bumper beam main body, the geometrical moment of inertia of the bumper beam main body is improved, and the load for the crushing in the front-rear direction of the center gusset can be improved. Additionally, the rib is formed in a manner such that the rib and the intermediate wall form a straight line; thus, when a load in a crash is input into the center gusset, the load is supported by the intermediate wall. Therefore, the geometrical moment of inertia of the substantially center portion of the bumper beam main body and the load for the crushing in the front-rear direction of the center gusset can be improved by the rib provided on the front face of the front wall of the bumper beam main body, so as to obtain well-balanced values of the geometrical moment of inertia and the load for the crushing. Accordingly, it is possible to easily and reliably obtain performance for impact absorption preferable for a pole crash.

In this case of providing the rib on the front face of the front wall of the bumper beam main body, preferably, the center gusset has a rib (e.g., a rib 25 in the embodiment) provided on a back face of the center gusset in a manner such that both ribs face each other, and can contact each other when a crash occurs.

In a preferable example, the rib on the front face of the front wall protrudes from the center gusset in a length direction of the bumper beam main body. More generally, the bumper beam main body may have a rib which protrudes from the center gusset in a length direction of the bumper beam main body. Accordingly, various kinds of bumper designs can be easily realized by providing a rib suitable for a target design.

DETAILED DESCRIPTION OF THE INVENTION

Hereinafter, an embodiment according to the present invention will be described with reference to FIGS. 1 to 7.

Figure 3:
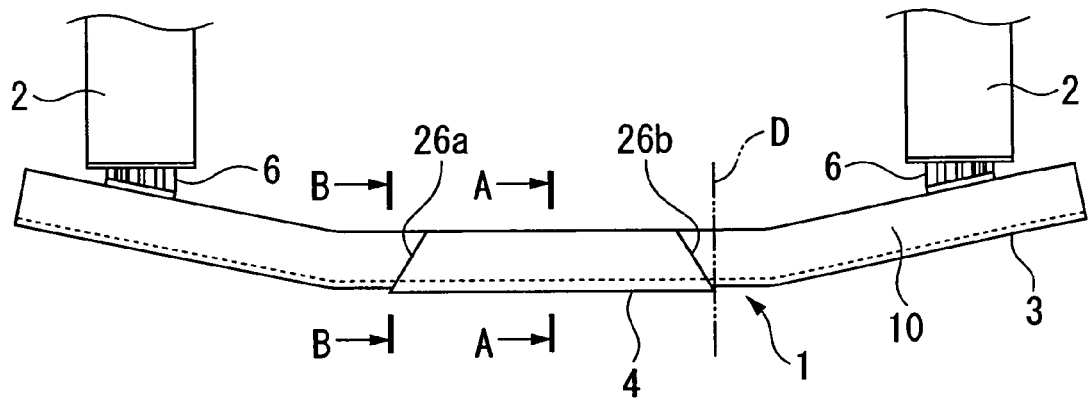
FIG. 3 is a plan view showing a frame portion of the back side of a vehicle body, to which the bumper beam structure of the embodiment is attached.
Figure 4:
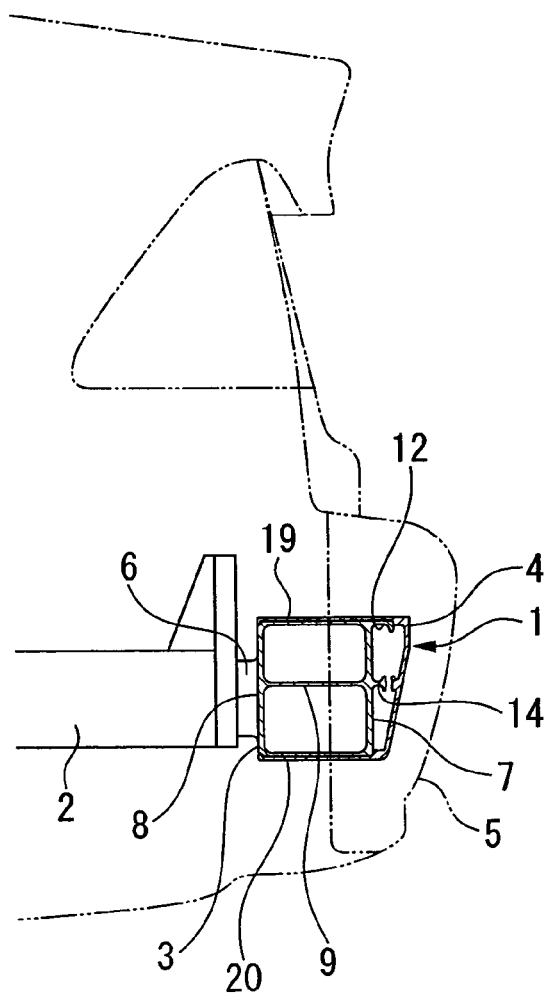
FIG. 4 is a sectional view along line A-A in FIG. 3.

FIG. 3 is a plan view showing a frame portion of the back side of a vehicle body, to which a bumper beam structure of the present embodiment is attached. FIG. 4 is a sectional view along line A-A in FIG. 3. As shown in FIGS. 3 and 4, a bumper beam structure 1 of the present embodiment mainly consists of (i) a bumper beam main body 3 extending in a width direction of the vehicle body, wherein a rear face of the bumper beam main body 3 is joined to rear side frames 2 on either side of the vehicle body, and (ii) a center gusset 4 joined to substantially the center of the bumper beam main body 3 in the length direction thereof, wherein the center gusset 4 is attached to a front face side of the bumper beam main body 3. In addition, as shown in FIG. 4, a bumper face 5 can be attached to the bumper beam structure 1.

The bumper beam main body 3 is integrally formed by extrusion molding using an aluminium material, and both end portions of the bumper beam main body 3 in the length direction bend slightly towards the front of the vehicle body. In addition, bumper stays 6 are attached to a rear wall 8 of the bumper beam main body 3. Accordingly, the bumper beam main body 3 is joined via the bumper stays 6 to the rear ends of the rear side frames 2 (i.e., the ends toward the rear of the vehicle body).

Figure 1:
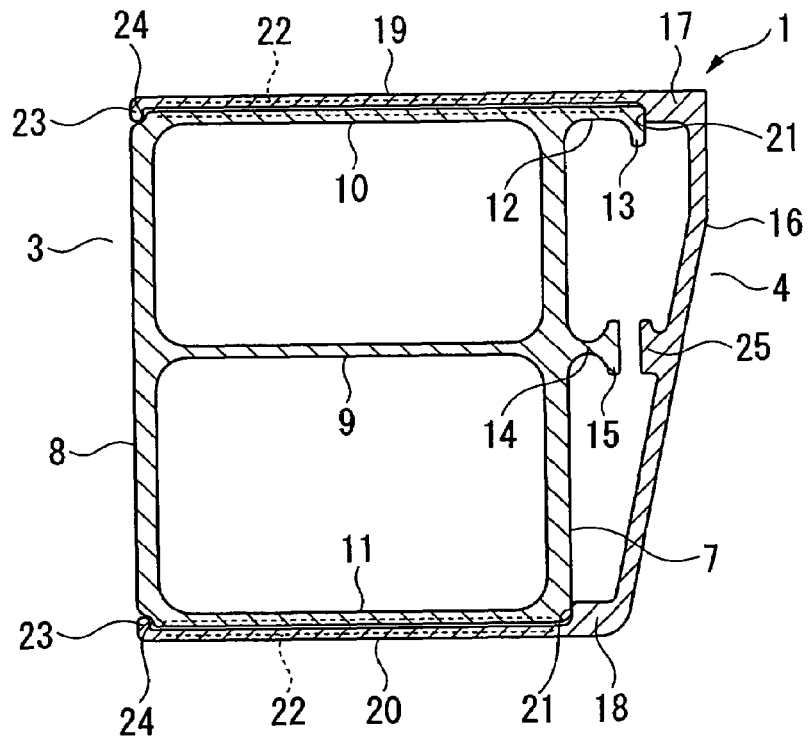
FIG. 1 is a sectional view which shows a bumper beam structure as an embodiment according to the present invention and is an enlarged view of a specific portion in FIG. 4.
Figure 2:
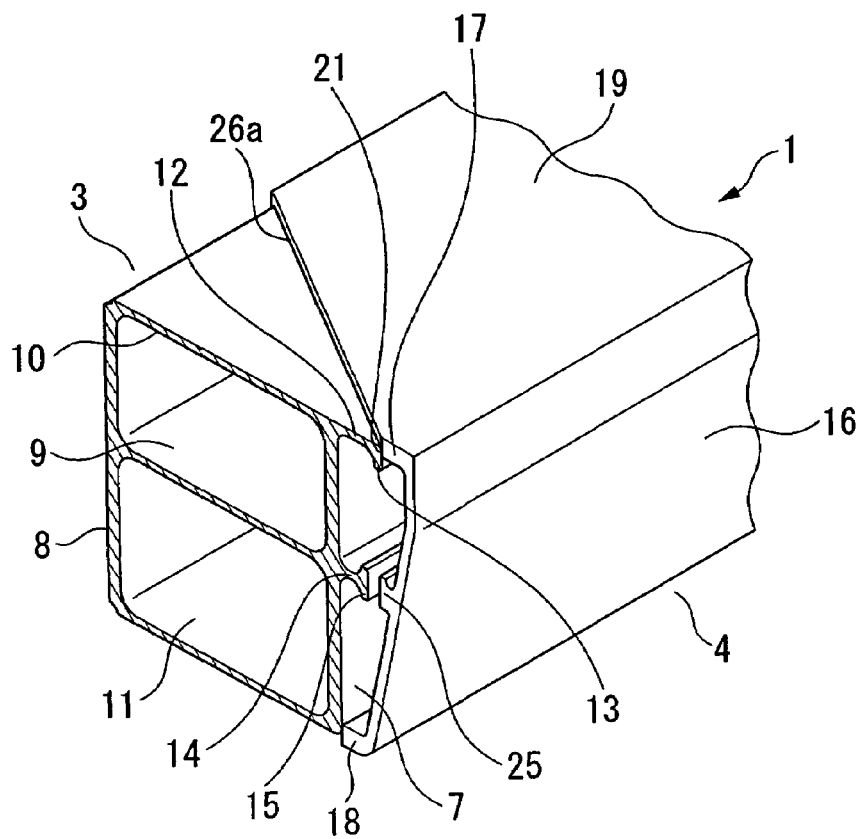
FIG. 2 is a partially-broken perspective view along line B-B in FIG. 3.

FIG. 1 is an enlarged view of a specific portion in FIG. 4. FIG. 2 is a partially-broken perspective view along line B-B in FIG. 3. As shown in FIGS. 1 and 2, the bumper beam main body 3 has a substantially square-shaped section, and an intermediate wall 9 for connecting a front wall 7 and the rear wall 8 is provided at the center of the square-shaped section in the vertical direction. The intermediate wall 9 is arranged substantially in parallel to an upper wall 10 and a lower wall 11, so that the bumper beam main body 3 has a sectional shape like two stacked rectangles. A first rib 12 protrudes towards the front (in the present embodiment, the back of the vehicle body) from the upper end of the front face of the front wall 7. The first rib 12 is straightly joined to the upper wall 10, and is integrally formed with the upper wall 10 and the front wall 7. An end portion 13 of the first rib 12 bends downward, thereby forming an L shape. A second rib 14 protrudes from the front wall 7 towards the front in a manner such that the second rib 14 straightly extends from the intermediate wall 9. The second rib 14 has an end portion 15 having a T-shaped section.

Similarly to the bumper beam main body 3, the center gusset 4 is formed by extrusion molding using an aluminium material. The center gusset 4 has a substantially U-shaped basic section. More specifically, the center gusset 4 has a gusset base wall 16 which covers the front side of the bumper beam main body 3. On either side of the gusset base wall 16 in the vertical direction, coupling walls 17 and 18 as bent portions are respectively provided, and a pair of support walls 19 and 20 are respectively joined to the coupling walls 17 and 18. The support walls 19 and 20 are respectively laid over the upper wall 10 and the lower wall 11 of the bumper beam main body 3, and are thinner than the coupling walls 17 and 18. Therefore, front ends of the coupling walls 17 and 18 respectively have step-form fitting portions 21, where the height of the step corresponds to the difference between the thickness of each support wall and the thickness of the corresponding coupling wall. The center gusset 4 is adhered and fastened to the bumper beam main body 3 in a manner such that the upper and the lower fitting portions 21 are respectively made to contact the first rib 12 and a lower end of the front wall 7 of the bumper beam main body 3, and that the upper and the lower support walls 19 and 20 are respectively laid over the upper wall 10 and the lower wall 11 of the bumper beam main body 3. In the present embodiment, a closed section including the front wall 7 and the gusset base wall 16 is formed on the front face side of the bumper beam main body 3. In FIG. 1, areas 22 surrounded by dotted lines indicate portions where the support walls 19 and 20 are respectively adhered and fastened to the upper wall 10 and the lower wall 11.

At the ends of the support walls 19 and 20, fitting hooks 23 are provided. Each fitting hook 23 bends inward, and is fit to a recess 24 at the corresponding corner of the bumper beam main body 3.

In addition, on the back face of the gusset base wall 16, a rib 25 is provided, which faces the second rib 14 of the bumper beam main body 3 via a specific gap. After the center gusset 4 is attached to the bumper beam main body 3, this rib 25 and the intermediate wall 9 of the bumper beam main body 3 are arranged on the same straight line.

Each of the upper and the lower support walls 19 and 20 has ends 26a and 26b in the length direction thereof (see FIG. 3). The ends 26a and 26b are each inclined toward the center in the vehicle's width direction by a specific angle measured from a plane D which is perpendicular to the length direction of the center gusset 4.

As explained above, in the bumper beam structure 1, a pair of the support walls 19 and 20, as extended portions of the center gusset 4, are respectively adhered and fastened to the upper wall 10 and the lower wall 11 of the bumper beam main body 3 in a manner such that the support walls 19 and 20 are laid over the upper wall 10 and the lower wall 11. Therefore, it is possible to improve the geometrical moment of inertia of a support portion for the center gusset 4 without increasing the thickness of side edge portions of the bumper beam main body 3. That is, in the bumper beam structure 1, the support walls 19 and 20 of the center gusset 4 are respectively laid over and adhered to substantially the center areas of the upper wall 10 and the lower wall 11 of the bumper beam main body 3 in the length direction of the bumper beam main body 3; thus, only the above center areas of the bumper beam main body 4, which have the support walls 19 and 20, are substantially thicker than the other areas of the bumper beam main body 3. Therefore, the present structure causes no unnecessary increase in the weight of the bumper beam main body 3, and when a pole crash or a center crash occurs, the center gusset 4 can be reliably crushed first.

The present structure also causes no unnecessary increase in the weight of side edge portions of the bumper beam main body 3. Therefore, when an offset crash occurs, it is possible to easily perform a tuning for delaying the crushing (i.e., buckling) of the rear side frame 2 in comparison with the crushing of the bumper beam main body 3.

Figure 5:
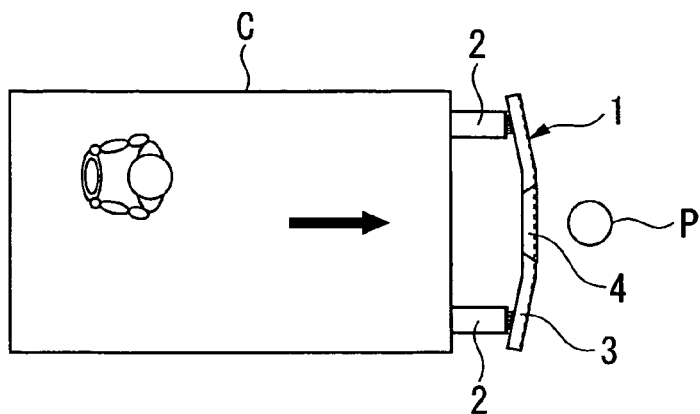
FIG. 5 is a plan view showing a general state of a pole crash of a vehicle which employs the bumper beam structure of the embodiment.

FIG. 5 is a plan view showing a general state of a pole crash in which substantially the center part of the bumper beam structure 1 of a vehicle C, which is moving backward at a low speed, crashes against a support pole P. In such a pole crash, the center gusset 4 is first crushed at the initial stage of the crash against the support pole P, and then the bumper beam main body 3 is bent and deformed, and then crashed. According to such a process, the impact of the crash can be reliably absorbed.

Figure 6:
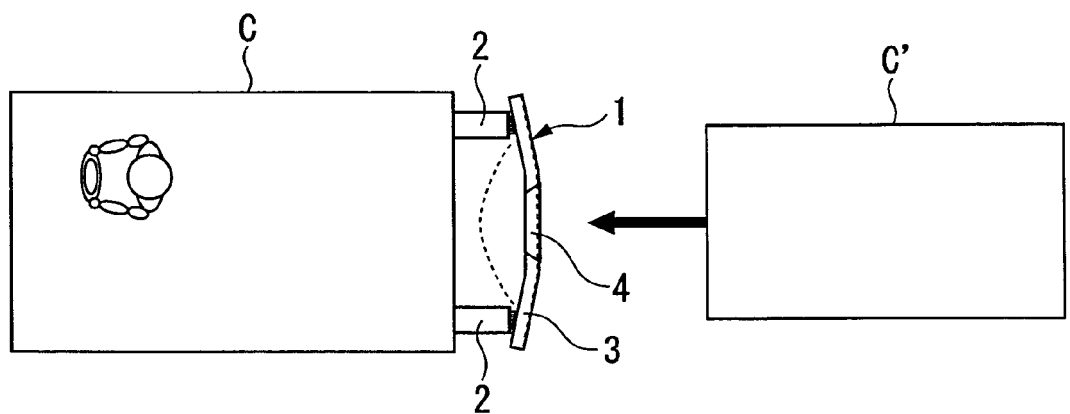
FIG. 6 is a plan view showing a general state of a flat crash of a vehicle which employs the bumper beam structure of the embodiment.

FIG. 6 is a plan view showing a general state of a flat crash in which another vehicle C', running at a high speed, crashes head-on with the back of the vehicle C. In such a flat crash, the center gusset 4 is first crushed and then the bumper beam main body 3 is bent and deformed, and then crushed, and finally, the rear side frames 2 are crushed. According to such a process, the impact of the crash can be reliably absorbed.

Figure 7:
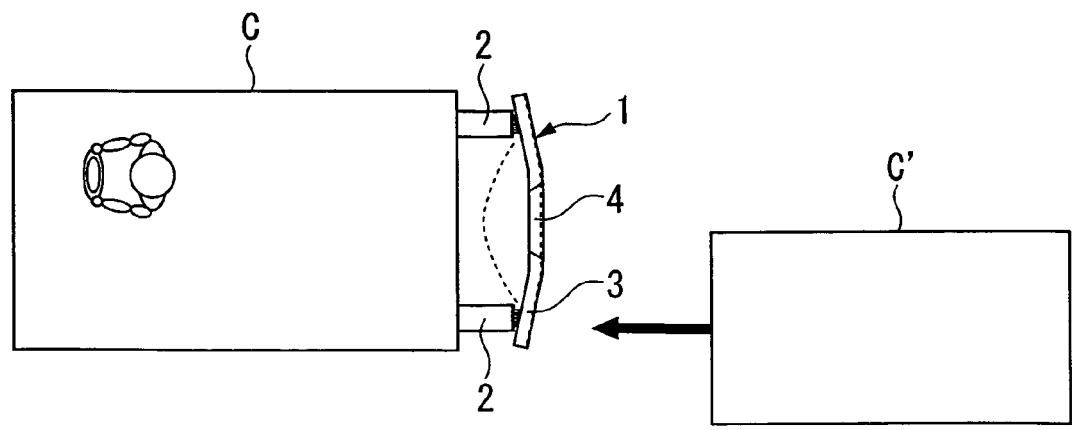
FIG. 7 is a plan view showing a general state of a high-speed offset crash of a vehicle which employs the bumper beam structure of the embodiment.

FIG. 7 is a plan view showing a general state of an offset crash in which another vehicle C', running at a high speed, crashes against a rear edge portion of the vehicle C. In such an offset crash, a side edge portion of the bumper beam main body 3 is first crushed, and then the relevant rear side frame 2 is crushed, thereby reliably absorbing the impact of the crash.

In the bumper beam structure 1, the support walls 19 and 20 of the center gusset 4 are fastened to the upper and the lower walls 10 and 11 of the bumper beam main body 3 by adhesion. Therefore, the strength of the material or the load of the crash are not lowered by heat. In addition, a wide area joint is provided, thereby improving the strength of the joint.

Additionally, in the bumper beam structure 1, the ends 26a and 26b of each of the support walls 19 and 20 are inclined from the plane D which is perpendicular to the length direction of the center gusset 4. Therefore, when the above-described offset crash occurs, stress applied to the boundary between each end (26a or 26b) and the bumper beam main body 3 can be widely distributed over a wider area along the inclined line of the end (26a or 26b). Therefore, stress concentration in the bumper beam main body 3 does not easily occur, and the impact of the crash can be reliably absorbed by plastic deformation of a wide area of the portion which receives the impact.

Also in the bumper beam structure 1, the support walls 19 and 20 are adhered to the upper and the lower walls 10 and 11 while the fitting portions 21 of the center gusset 4 are made to contact the front side of the bumper beam main body 3. Therefore, when a pole crash or a flat crash occurs, the load of the crash is imposed via the fitting portions 21 on the front side of the bumper beam main body 3, and thus is not easily imposed on the faces of the support walls 19 and 20, which are laid over and adhered to the upper and the lower walls 10 and 11. Therefore, it is possible to prevent the support walls 19 and 20 from being detached from the upper and the lower walls 10 and 11.

Additionally, in the present embodiment, the second rib 14 is provided at the front wall 7 of the bumper beam main body 3 in a manner such that the second rib 14 and the intermediate wall 9 form a straight line. When a pole crash or a flat crash occurs, the rib 25 on the back face of the center gusset 4 contacts the second rib 14. According to the ribs 25 and 14, the load for the crushing can be easily tuned. In addition, the ribs 25 and 14 can not only improve the geometrical moment of inertia of the bumper beam main body 3 and the center gusset 4, but also contribute to maintaining the load for the crushing at a high level. Such effects cannot be obtained when the section of the bumper beam main body 3 or the center gusset 4 is simply widened.

Furthermore, if the first rib 12 and the second rib 14 are extended so as to protrude from the ends of the center gusset 4 (i.e., exceed the range where the center gusset 4 is arranged), the strength of the side edges of the bumper beam main body 3 can be improved without considerably increasing the weight of the bumper beam main body 3. The length for the extension of each of the first rib 12 and the second rib 14 may be determined in accordance with the form of the bumper face. In this case, various kinds of bumper designs can be easily realized without increasing the weight of the bumper beam main body 3.

Figure 8:
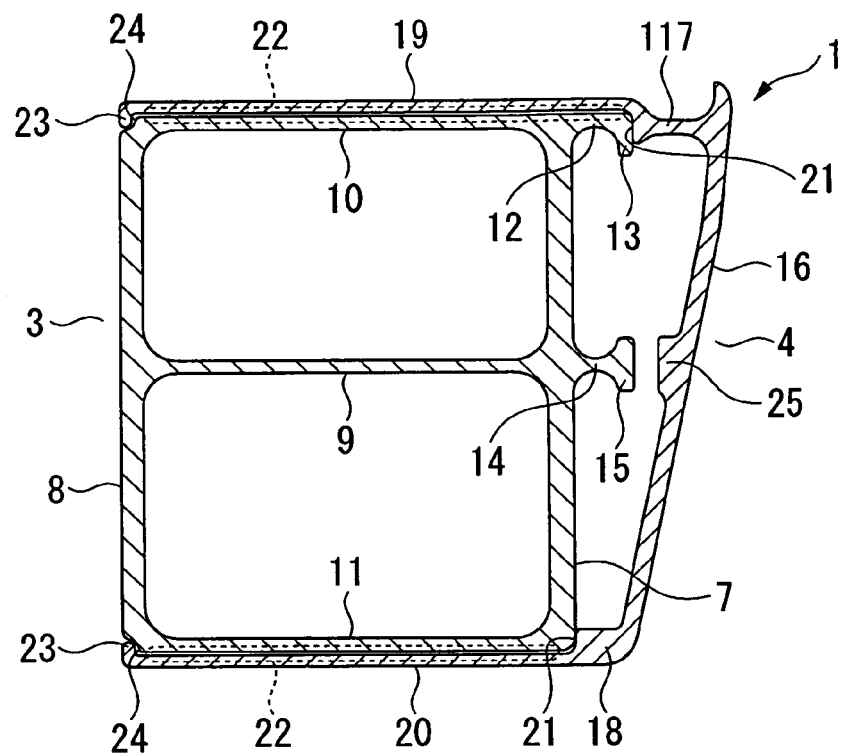
FIG. 8 is a sectional view which shows a bumper beam structure as another embodiment according to the present invention and is an enlarged view corresponding to FIG. 1.

In the above-described embodiment, the thickness of the coupling wall 17 differs from that of the support wall 19 in the center gusset 4, and the step portion produced between both walls due to the difference between the thicknesses functions as the fitting portion 21 which is made to contact the front side of the bumper beam main body 3. However, as shown in FIG. 8, a coupling wall 117 may be provided, which has a bent portion so as to produce a step form which functions as a fitting portion 21. In this case, when a pole crash or a flat crash occurs, the coupling wall 117, which belongs to a path for transmitting the load of the crash, has an offset position with respect to the support wall 19, thereby further reliably preventing the support wall 19 from being detached.

Figure 9:
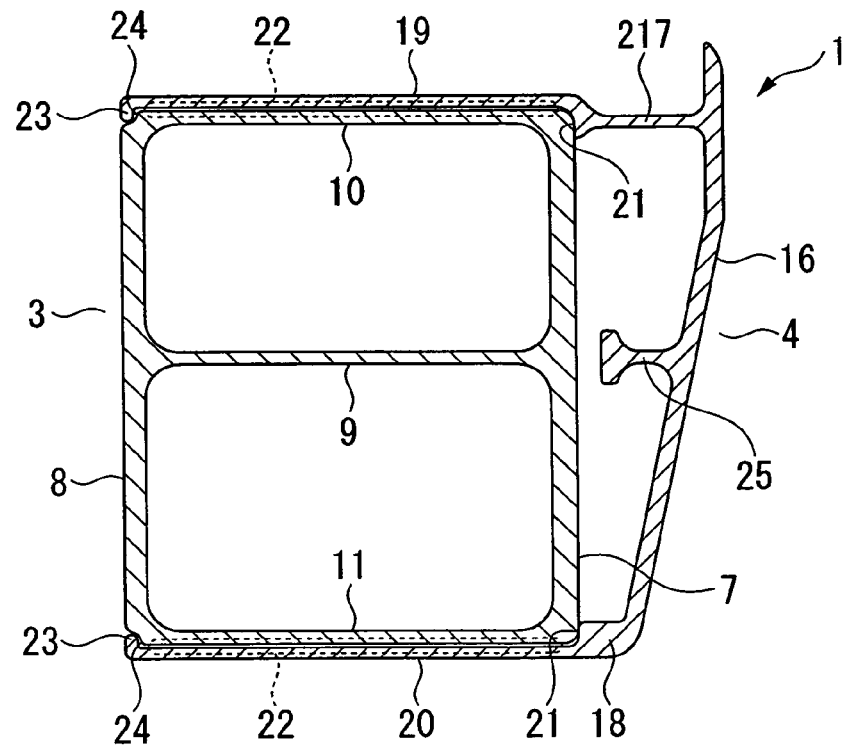
FIG. 9 is also a sectional view which shows a bumper beam structure as another embodiment according to the present invention and is an enlarged view corresponding to FIG. 1.

It is not always necessary to provide the first rib 12 or the second rib 14 of the bumper beam main body 3. As shown in FIG. 9, the ribs of the bumper beam main body 3 may be omitted, and a coupling wall 217 may be provided which has a fitting portion which is made to directly contact the upper corner of the front face of the bumper beam main body 3. In this case, the section form of the bumper beam main body 3, which is a long and large-sized part can be simplified, thereby allowing extrusion molding to be easily performed so as to form the bumper beam main body 3.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A bumper beam structure, comprising:
   a bumper beam main body which is a metal and molded material and extends in a width direction of a vehicle, wherein a rear face side of the bumper beam main body is joined to side frames on either side of the vehicle; and
   a center gusset joined to a substantially center portion of the bumper beam main body in the length direction of the bumper beam main body so as to produce a closed section at a front face of the bumper beam main body, wherein:
   the center gusset has a pair of support walls which are respectively adhered and fastened to upper and lower walls of the bumper beam main body in a manner such that the support walls are respectively laid over the upper and the lower walls, and wherein in each support wall, ends in a length direction of the support wall are inclined with respect to a plane which is perpendicular to the length direction.

2. The bumper beam structure according to claim 1, wherein in each support wall, ends in a length direction of the support wall are inclined with respect to a plane which is perpendicular to the length direction.

3. The bumper beam structure according to claim 1, wherein:
   the bumper beam main body has a front wall and a rear wall, and an intermediate wall for connecting the front and the rear walls which is integrally formed with the front and the rear walls; and
   the center gusset has a rib provided on a back face of the center gusset in a manner such that the rib faces a front face of the front wall of the bumper beam main body and that the rib and the intermediate wall form a straight line.

4. The bumper beam structure according to claim 1, wherein a rib protrudes from the center gusset and extends in the length direction of the bumper beam main body.

5. A bumper beam structure, comprising:
   a bumper beam main body which is a metal and molded material and extends in a width direction of a vehicle, wherein a rear face side of the bumper beam main body is joined to side frames on either side of the vehicle; and a center gusset has a pair of support walls which are respectively adhered and fastened to upper and lower walls of the bumper beam main body in a manner such that the support walls are respectively laid over the upper and the lower walls, wherein the center gusset has a fitting portion which contacts a front face of a front wall of the bumper beam main body, and wherein the center gusset has a fitting portion which contacts a front face of a front wall of the bumper beam main body.

6. The bumper beam structure according to claim 5, wherein:

the bumper beam main body has an intermediate wall for connecting the front wall and a rear wall of the bumper beam main body, and the intermediate wall is integrally formed with the front and the rear walls; and the center gusset has a rib provided on a back face of the center gusset in a manner such that the center gusset rib faces the front face of the front wall of the bumper beam main body and such that the center gusset rib and the intermediate wall form a straight line.

7. The bumper beam structure according to claim 5, wherein a rib protrudes from the center gusset and extends in the length direction of the bumper beam main body.

8. A bumper beam structure, comprising:

a bumper beam main body which is a metal and molded material and extends in a width direction of a vehicle, wherein a rear face side of the bumper beam main body is joined to side frames on either side of the vehicle, and wherein the bumper beam main body has:

a front wall and a rear wall, and an intermediate wall for connecting the front and the rear walls which is integrally formed with the front and the rear walls; and a rib provided on a front face of the front wall in a manner such that the rib and the intermediate wall form a straight line and such that the rib faces a back face of a center gusset; and the center gusset is joined to a substantially center portion of the bumper beam main body in a length direction of the bumper beam main body so as to produce a closed section at a front face of the bumper beam main body, wherein:

the center gusset has a pair of support walls which are respectively adhered and fastened to upper and lower walls of the bumper beam main body in a manner such that the support walls are respectively laid over the upper and the lower walls.

9. The bumper beam structure according to claim 8, wherein:

the center gusset has a rib provided on the back face of the center gusset in a manner such that the center gusset rib and the front wall rib face each other, and can contact each other when a crash occurs.

10. The bumper beam structure according to claim 9, wherein the center gusset has a fitting portion which contacts the front face of the front wall of the bumper beam main body.

11. The bumper beam structure according to claim 9, wherein the center gusset rib protrudes from the center gusset and extends in the length direction of the bumper beam main body.

12. The bumper beam structure according to claim 8, wherein a rib protrudes from the center gusset and extends in the length direction of the bumper beam main body.

13. The bumper beam structure according to claim 12, wherein the center gusset has a fitting portion which contacts the front face of the front wall of the bumper beam main body.

14. The bumper beam structure according to claim 8, wherein the center gusset has a fitting portion which contacts the front face of the front wall of the bumper beam main body.

15. The bumper beam structure according to claim 8, wherein the center gusset has a center gusset rib provided on the back face of the center gusset in a manner such that the center gusset rib faces the front face of the front wall of the bumper beam main body and that the center gusset rib and the intermediate wall form a straight line.

* * * * *

UNITED STATES PATENT AND TRADEMARK OFFICE
CERTIFICATE OF CORRECTION

| | | |
|---|---|---|
| PATENT NO. | : 7,338,099 B2 | Page 1 of 1 |
| APPLICATION NO. | : 11/269386 | |
| DATED | : March 4, 2008 | |
| INVENTOR(S) | : Okabe et al. | |

It is certified that error appears in the above-identified patent and that said Letters Patent is hereby corrected as shown below:

Column 8, Line 44, (Claim 2), delete Claim 2 in its entirety and insert
--Claim 2. The bumper beam structure according to claim 1, wherein the center gusset has a fitting portion which contacts a front face of a front wall of the bumper beam main body.--

Column 8, Line 57, (Claim 3, line 10), after "and" (first occurrence), insert --such--.

Column 8, Line 62, (Claim 5), delete Claim 5 in its entirety and insert
--Claim 5. A bumper beam structure, comprising:
a bumper beam main body which is a metal and molded material and extends in a width direction of a vehicle, wherein a rear face side of the bumper beam main body is joined to side frames on either side of the vehicle; and
a center gusset is joined to a substantially center portion of the bumper beam main body in a length direction of the bumper beam main body so as to produce a closed section at a front face of the bumper beam main body, wherein:
the center gusset has a pair of support walls which are respectively adhered and fastened to upper and lower walls of the bumper beam main body in a manner such that the support walls are respectively laid over the upper and the lower walls, wherein the center gusset has a fitting portion which contacts a front face of a front wall of the bumper beam main body, and wherein the center gusset has a coupling wall which is joined to either of the support walls and is bent so that a step form is produced by the coupling wall and said either of the support walls, and the fitting portion belongs to the coupling wall.--

Signed and Sealed this

Third Day of June, 2008

JON W. DUDAS
*Director of the United States Patent and Trademark Office*